(12) United States Patent
Holzapfel (10) Patent No.: US 12,092,179 B2
(45) Date of Patent: Sep. 17, 2024

(54) INTERNALLY VENTILATED ROTOR

(71) Applicant: BREMBO SGL CARBON CERAMIC BRAKES GMBH, Meitingen (DE)

(72) Inventor: Torsten Holzapfel, Meitingen (DE)

(73) Assignee: BREMBO SGL CARBON CERAMIC BRAKES GMBH, Meitingen (DE)

( * ) Notice: Subject to any disclaimer, the term of this patent is extended or adjusted under 35 U.S.C. 154(b) by 368 days.

(21) Appl. No.: 17/620,260

(22) PCT Filed: Jun. 26, 2020

(86) PCT No.: PCT/EP2020/068049
§ 371 (c)(1),
(2) Date: Dec. 17, 2021

(87) PCT Pub. No.: WO2020/260601
PCT Pub. Date: Dec. 30, 2020

(65) Prior Publication Data
US 2022/0364619 A1    Nov. 17, 2022

(30) Foreign Application Priority Data
Jun. 28, 2019 (DE) .......................... 102019209499.6

(51) Int. Cl.
  *F16D 65/12*       (2006.01)
  *F16D 65/847*      (2006.01)
  *F16D 65/02*       (2006.01)

(52) U.S. Cl.
  CPC ......... *F16D 65/847* (2013.01); *F16D 65/128* (2013.01); *F16D 2065/1328* (2013.01);
  (Continued)

(58) Field of Classification Search
  CPC ................... F16D 65/847; F16D 65/12; F16D 65/123–128; F16D 2065/1328; F16D 2200/0043; F16D 2200/0052
  (Continued)

(56) References Cited

U.S. PATENT DOCUMENTS 2,243,334 A * 5/1941 Eksergian ............. F16D 65/123
                                              324/121 R
3,623,579 A   11/1971 Hendrickson et al.
  (Continued)

FOREIGN PATENT DOCUMENTS

DE    19651798 A1    6/1998
DE    19834704 A1    2/2000
  (Continued)

OTHER PUBLICATIONS

Office Action issued on Aug. 11, 2023, in corresponding European Application No. 20735536.3, 8 pages.
(Continued)

*Primary Examiner* — Christopher P Schwartz
(74) *Attorney, Agent, or Firm* — Maier & Maier, PLLC (57) ABSTRACT

An internally ventilated rotor, including at least two disc elements which are interconnected by at least one cooling element, the at least one cooling element having a textile fabric which extends from one disc element contact region of the cooling element, by which the cooling element is in contact with one disc element, as far as into another disc element contact region of the cooling element, by which the cooling element is in contact with another disc element.

15 Claims, 6 Drawing Sheets

(52) U.S. Cl.
CPC ............... *F16D 2200/0043* (2013.01); *F16D 2200/0052* (2013.01)

(58) Field of Classification Search
USPC .................................................. 188/218 XL
See application file for complete search history.

(56) References Cited

U.S. PATENT DOCUMENTS

| | | | |
|---|---|---|---|
| 6,193,023 B1* | 2/2001 | Telfer | F16D 65/12 |
| | | | 188/71.6 |
| 6,666,310 B1 | 12/2003 | Berreth et al. | |
| 9,255,618 B2* | 2/2016 | Beer | F16D 69/0408 |
| 9,574,629 B2* | 2/2017 | Torres Gutierrez | F16D 65/128 |
| 2002/0153213 A1 | 10/2002 | Gruber et al. | |
| 2003/0146059 A1* | 8/2003 | Goller | F16D 69/023 |
| | | | 188/218 XL |
| 2004/0035659 A1* | 2/2004 | Pacchiana | C04B 35/645 |
| | | | 188/218 XL |
| 2008/0135359 A1* | 6/2008 | Basirico | F16D 65/128 |
| | | | 188/218 XL |
| 2010/0206674 A1* | 8/2010 | Monsere | F16D 65/0006 |
| | | | 188/218 XL |
| 2015/0267765 A1* | 9/2015 | Kim | F16D 13/72 |
| | | | 192/113.21 |
| 2021/0207670 A1* | 7/2021 | Qi | F16D 65/127 |

FOREIGN PATENT DOCUMENTS

| | | | |
|---|---|---|---|
| DE | 60115964 T2 | 8/2006 | |
| DE | 102010007474 A1 | 11/2010 | |
| DE | 102011101432 A1 | 11/2012 | |
| DE | 102013201303 A1 | 8/2013 | |
| GB | 2444927 A | 6/2008 | |
| JP | 2002372080 A | 12/2002 | |
| JP | 2016502040 A | 1/2016 | |
| JP | 2017150511 A | 8/2017 | |
| KR | 1020150075117 A | 7/2015 | |
| WO | 2006002471 A1 | 1/2006 | |
| WO | 2014068540 A1 | 5/2014 | |
| WO | WO-2017146032 A1 * | 8/2017 | ............ F16D 65/12 |

OTHER PUBLICATIONS

International Search Report (with English Translation) and Written Opinion (with Machine Translation) issued on Sep. 15, 2020 in corresponding International Application No. PCT/EP2020/068049; 13 pages.

\* cited by examiner

INTERNALLY VENTILATED ROTOR

FIELD

The invention relates to an internally ventilated rotor that can be used in particular as a brake disc.

BACKGROUND

Internally ventilated brake discs primarily have the function of decelerating a body that is moved in a rotational manner. The kinetic energy is thereby converted into heat. In order to improve this dissipation process, the aim is to rapidly dissipate the heat to the environment. This occurs by means of forced convection in the internally ventilated region. In this case, the convection process is directly dependent on the shape and surface area of the cooling elements arranged in the internally ventilated region and the cooling channels defined thereby.

Connecting elements, for example in the form of connecting ribs, may be provided between the friction rings of internally ventilated brake discs, around and/or through which air can flow. The connecting ribs can be designed as lattice-like supporting structure, for example, as described in DE 195 37 392.

However, they can also have completely different forms. GB 2543020 describes an internally ventilated brake disc, which is conventionally cast out of metal by means of a lost core made of sand and resin. The brake disc described in this document comprises two friction rings, which have a common axis of rotation and are spaced apart along this axis such that a gap filled with air is formed. They also comprise a plurality of air-guiding ribs, which extend outwards with respect to this axis in order to conduct cooling air through the gap filled with air. All of the air-guiding ribs are rotated along their outward extension. For specific air-guiding rib shapes, GB 2543020 proposes producing lost cores by means of 3D printing.

It is clear from GB 2543020 that there are several possibilities with regard to varying the shape of the air-guiding ribs of conventional cast internally ventilated metal brake discs.

These do not exist for fibre-reinforced ceramic internally ventilated brake discs. Until now, ceramic brake discs have been produced having a mixture of fibres, resin and carbon-rich raw materials are moulded in a mould while being subjected to pressure and temperature to form a brake disc blank. In this case, the properties of resins are utilised in order to harden the blank as the temperature increases. In another step, the blank is pyrolysed. Furthermore, the fibre-reinforced carbon ring can be infiltrated with silicon, as a result of which the mechanical and thermal properties in particular change. In order to meet the geometric requirements, mechanical processing steps can preferably be carried out. Some known methods of producing fibre-reinforced ceramic brake discs are described in European patent no. 2 334 945, in particular in paragraphs 6 to 10.

Fibre-reinforced ceramic brake discs have thus far had the production-related disadvantage that intermediate elements, in particular in the form of cooling fins, are broad in relation to their height on account of the limited mouldability of the starting material. Based on this, European patent no. 2 334 945 proposes a method that is intended to make it possible to make the form of the cooling channels more cost-effective and simpler. The method comprises: (a) producing load discs, friction surfaces and air-guiding elements of the disc rotor by means of separate processes each time using a carbon fibre-reinforced carbon-carbon composite, (b) connecting the load discs, friction surfaces and air-guiding elements produced by separate processes in each case to form a structure, and (c) performing a liquid silicon melt infiltration process on the connected structure. The material of the load discs and the air-guiding elements is always the same in this case.

SUMMARY

The problem addressed by the present invention is that of providing an internally ventilated rotor, which simultaneously allows for the largest possible braking power and minimum overall weight of the braking device.

This problem is solved by an internally ventilated rotor, comprising at least two disc elements that are connected to one another by means of at least one cooling element, wherein the at least one cooling element comprises a textile fabric which extends from a disc element contact region of the cooling element, by means of which the cooling element is in contact with a disc element, as far as a different disc element contact region of the cooling element, by means of which the cooling element is in contact with another disc element.

Figure 1:
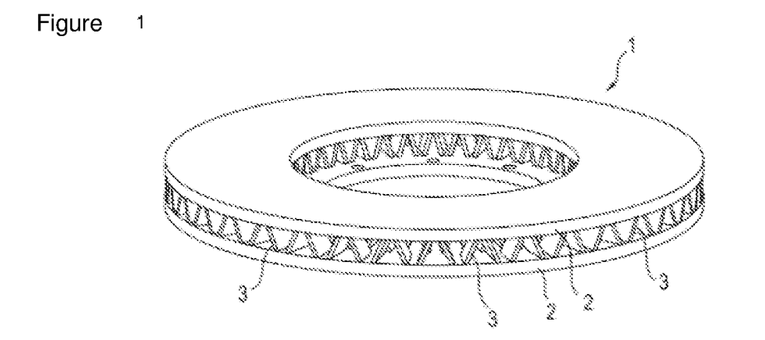
FIG. 1 shows a rotor according to the invention.
Figure 2:
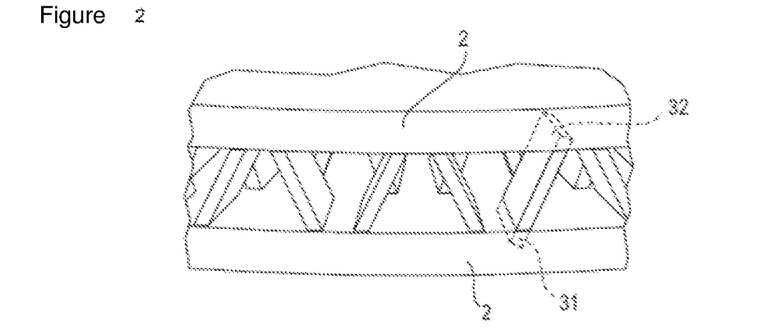
FIG. 2 shows an enlarged cut-out of the rotor shown in FIG. 1.
Figure 3:
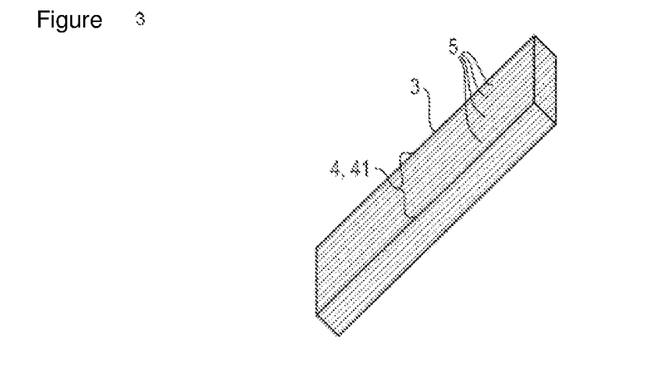
FIG. 3 shows a cooling element of the rotor from FIGS. 1 and 2, in which the textile fabric is a laid scrim.

The number of cooling elements by means of which the disc elements are connected to one another is not limited. The invention can be implemented using just one cooling element, for example if this is a cord-shaped cooling element, similar to that shown in FIG. 5, if this cooling element does not extend up and down between the disc elements in a circular fashion but extends up and down in a helical fashion. A small number of cooling elements can also be provided if the rotor comprises support elements in any case, which also connect the two disc elements to the cooling elements. However, a plurality of cooling elements may also be provided, in particular if these are cooling plates, as shown in FIGS. 1 to 3.

The textile fabric preferably comprises fibres that extend in parallel and at least one of the fibres extending in parallel extends from one disc element contact region of the cooling element as far as the other disc element contact region of the cooling element. In general, a plurality of the fibres extending in parallel extend from one disc element contact region to the other disc element contact region. Each tensile load is then directly transmitted from one of the disc elements to the other disc element by means of the fibre(s). Fibres are considered to extend in parallel therein if they extend at an angle of no more than 15° with respect to one another at any point of the cooling element. In this case, one of a plurality of fibres extending in parallel can, of course, extend in a completely different direction at one point of the cooling element to the direction in which another fibre of the fibres extending in parallel extends at a different point of the cooling element. In this regard, reference is made to FIG. 5A, for example, in which a plurality of fibres extending in parallel, only some of which are shown, collectively extend up and down in parallel with one another anywhere in the cooling element.

During braking, a perfectly uniform distribution of the contact pressures of the two brake pads is only ever approximately achieved. This in particular applies at the beginning of the braking process on account of the different contact point of the brake pads. A higher contact pressure leads to a greater amount of friction and thus to a greater reduction in the rotational speed. A disc element that is more heavily braked strives to rotate slower than a disc element that is not braked as heavily. As a result, torsional moments occur inside the rotor between the disc elements, which must not lead to a failure of the elements (cooling elements and optionally additional support elements) that connect the disc elements that are decelerated at different rates. It has been found that, especially in embodiments of the rotor according to the invention in which at least one of the fibres extending in parallel extends from one disc element contact region of the cooling element to the other disc element contact region of the cooling element, a failure is effectively counteracted by tensile forces being directly transferred from one disc element to the other disc element along the fibre direction. On account of the tensile load in the fibre direction, the cooling elements can be configured especially delicately such that the rotor can be constructed to be even lighter. This applies in particular if fibres that can be subjected to a particularly high amount of tensile loading extend from one disc element contact region of the cooling element to the other disc element contact region of the cooling element. This leads to even lighter rotors that can also be subjected to high loading.

Less delicate support elements, such as the air-guiding elements proposed in European patent no. 2 334 945 for connecting the friction discs, can have a greater degree of rigidity than cooling elements of the present invention. According to the invention, the same degree of rigidity of the rotor can, however, be provided by a higher number of more delicate cooling elements or by a close-mesh network of disc element contact regions on the disc elements. Since in this case a particularly large cooling element surface area is also produced, according to the invention, better dissipation of the heat produced during braking is achieved while the rigidity of the rotor remains the same.

The textile fabric is preferably a laid scrim or woven fabric and a plurality of fibres extending in parallel therein extend from one disc element contact region of the cooling element as far as into the other disc element contact region of the cooling element. This causes these fibres extending in parallel to be subjected to loading in their main load direction and the best possible use is made of their tensile strength. The intended load capacity of the rotor is made possible with even more delicate cooling elements, i.e. with an even lower overall weight of the rotor.

However, the invention is not limited to embodiments in which the textile fabric is a laid scrim or a woven fabric. The textile fabric may, for example, also be a nonwoven fabric. This has thermal advantages since fibres also extend in the thickness direction of the cooling element and the cooling effect is therefore further improved. It is conceivable to combine nonwoven fabrics with laid scrims and/or woven fabrics. For example, a cooling element can be provided in a region subjected to low mechanical loading (for example near a support element that is provided in any case and also connects the two disc elements to the cooling elements), in which the textile fabric is a nonwoven fabric. Heat dissipation in particular is then improved here. Alternatively or in addition, a cooling element can be provided in a region subjected to greater mechanical loading (for example at a greater distance from a support element that is provided in any case and also connects the two disc elements to the cooing elements), in which the textile fabric is a laid scrim or a woven fabric. Above all, the mechanical load capacity (but also the thermal load capacity) is then further increased there. Threads, yarns, cords, knitted fabrics, braids and felts are also suitable as textile fabrics or as part of textile fabrics.

Laminar composite cooling elements are also conceivable, which comprise laid scrim and/or woven fabric plies in conjunction with nonwoven fabric plies. In order to counteract buckling of the cooling element, a plurality of spaced-apart plies of fibres extending in parallel have proven advantageous, in particular when fibres extending in parallel from both plies extend from one disc element contact region as far as into the other disc element contact region. This can be implemented by means of cooling elements in the form of cooling plates, for example, in which two or even more plies of unidirectional laid scrim oriented in parallel, for example carbon fibre laid scrim having one or more support layers arranged between these plies, are kept at a spacing from one another. The spacing d of the furthest apart plies of fibres extending in parallel of the cooling element is then preferably more than a times 0.025, in particular more than a times 0.05, wherein a is the distance between the disc elements connected by means of the cooling element.

The textile fabric and/or the fibres extending in parallel can comprise carbon fibres, silicon carbide fibres, boron nitride fibres or mixtures thereof. A person skilled in the art will choose the fibres depending on whether particularly pronounced mechanical loads and/or thermal loads occur where the fibres are intended to be used. Said person will targetedly use the different mechanical and thermal properties of the different fibres. Carbon fibres are particularly preferable, since they have high tensile strength at a high temperature and a low density at the same time. On account of their high degree of temperature resistance, they remain in the semifinished product during the entire production process, including the siliconising process.

The form of the cooling element(s) is not subject to any restrictions. In principle, any form is conceivable. In specific embodiments of the rotor according to the invention, the at least one cooling element is a cooling plate. By targetedly arranging cooling plates, channels can be defined in a particularly simple manner. Therefore, the air flow can be controlled. In comparison with, for example, more delicate cooling elements, such as cooling rods, another advantage consists in the fact that the fibres support one another in plates.

The cooling elements can be curved. The cooling elements can be rotated along their extension, as described in GB 2543020, since the prepregs that can be used to produce the cooling elements can be shaped accordingly. The cooling elements (or their precursors, for example prepregs) can be made into the desired shape and then hardened.

The cooling elements preferably comprise a rough and/or structured surface. This encourages the formation of turbulent flows; as a result, the heat produced during braking is efficiently dissipated from the rotor.

The invention comprises embodiments of the rotor that comprise large or small cooling elements. Smaller, more delicate cooling elements are, however, preferable, since they can be used to achieve even more efficient heat dissipation. The relation of the cooling surface area A of the cooling element, for example the cooling plate, which faces the interior of the brake disc to the volume V of the portion of the cooling element, for example the cooling plate, which faces the interior of the brake disc is preferably at least 0.25 $mm^{-1}$, in particular at least 0.4 $mm^{-1}$, more preferably at least 0.5 $mm^{-1}$, particularly preferably at least 0.6 $mm^{-1}$, for example at least 0.8 $mm^{-1}$. The calculation of this relation therefore only includes those cooling element surfaces and those cooling element volume regions that face the interior. Regions that lie inside a disc element are not taken into consideration both when calculating the cooling surface area A and calculating the volume V, since the cooling element extends as far as into a region lying inside a disc element. Lastly, adhering to the relation stated here causes the heat transmission to be further increased while the compound remains unchanged. This in turn opens up the possibility of downscaling the size of the rotor as a whole such that the same braking power is achieved with a smaller and more lightweight braking system.

It is preferable for the cooling element or cooling elements to be inclined. It/they then does/do not extend orthogonally to the surfaces of the disc elements. The cooling element preferably extends at an angle of less than 89°, in particular of less than 80°, for example of less than 70° at least at a point that lies between two adjacent disc elements and is the same distance from these two disc elements. The angle is preferably greater than 20, in particular greater than 30°, for example greater than 35°. A person skilled in the art would choose this angle, inter alia, on the basis of the coefficient of friction. For very low coefficients of friction, the disc elements are primarily pressed together by the contact pressure between the brake shoes. At the same time, the torsional moment acting between the disc elements is only relatively low when the contact pressure between the two brake shoes is not uniform. A person skilled in the art would then choose an angle in the upper range. For very high coefficients of friction, the disc elements are not pressed together as strongly by the contact pressure between the brake shoes while the braking power remains the same. In general, the torsional moment is then greater when the contact pressure between the two brake shoes is not uniform. A person skilled in the art would then select an angle in the lower range. This causes the main fibre direction when braking to more frequently extend in the effective direction of force that results from torsional moments and contact pressures.

According to the invention, it is preferable for the rotor to comprise at least two cooling elements, for example cooling plates, which are oppositely inclined, or two cooling element regions of a cooling element that are oppositely inclined. In relation to the present invention, "oppositely inclined" means that one of the two cooling elements or one of the two cooling element regions would, as a whole, be stretched and the other cooling element or the other cooling element region would, as a whole, be compressed if one of the two disc elements were rotated with respect to the other disc element about the common axis of rotation of the two disc elements in the sense of the above-described torsional moment. Irrespective of which side of the rotor according to the invention a brake pad is more strongly pressed on, at least one of the cooling elements then always counteracts failure of the rotor in that it (and preferably the fibres thereof) is subjected to tensile loading. This stiffens the rotor. If the cooling elements are not inclined with respect to one another, on the whole they have to counteract rotation of one of the disc elements with respect to the other disc element about the common axis of rotation of the two disc elements to a lesser degree. This is because the rotation would then (on account of a parallelogram effect) not necessarily lead to tensile loading in one of the cooling elements. In order to achieve a predefined braking power, a rotor according to the invention comprising cooling elements that are inclined with respect to one another can, as a whole, therefore be designed to save on a greater amount of materials and the overall braking system can therefore be more lightweight.

The effect described above is achieved particularly effectively when the cooling elements or cooling element regions, which are oppositely inclined, are arranged near to one another in the rotor.

Preferred rotors according to the invention therefore comprise at least one pair of adjacent cooling elements, for example cooling plates. Orthogonal projections of the four disc element contact regions into the respective internal surface of the disc element that is in contact with the particular disc element contact region define four projection faces. Four points that lie inside the projection faces define the corners of a trapezium. If one point can therefore be determined in each of the four projection faces such that the four points define a trapezium, a rotor as per the invention that is preferable in this sense is provided.

Figure 8:
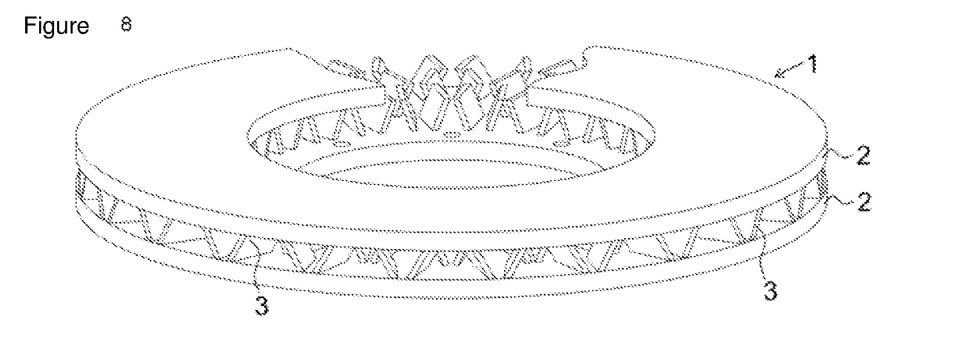
FIG. 8 shows another rotor according to the invention.
Figure 9:
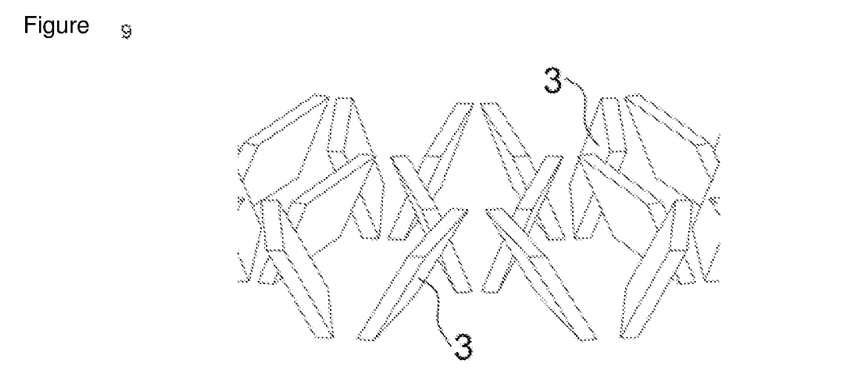
FIG. 9 shows cut-outs of cooling elements of the rotor from FIG. 8.
Figure 10:
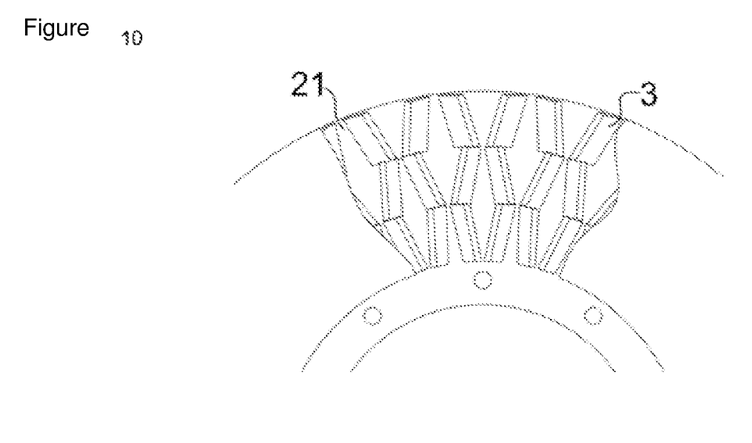
FIG. 10 shows a cut-out of FIG. 8 from above.

In a particularly preferred rotor that comprises cooling elements, for example cooling plates, which are oppositely inclined, the cooling elements, for example cooling plates, which are oppositely inclined define a cooling channel that tapers or widens in the radial direction. The cooling plates are then preferably arranged such that the two edges of the cooling plates that are closer to the axis of rotation of the rotor extend more closely to one another than the two edges of the cooling plates that are further away from the axis of rotation of the rotor; or in that the two edges that are closer to the axis of rotation of the rotor are further away from one another than the two edges of the cooling plates that are further away from the axis of rotation of the rotor. This can be achieved by an arrangement of cooling plates that is shown in FIGS. 8 to 10, for example.

A pair of oppositely inclined cooling plates can define a cooling channel that tapers outwards in the radial direction and another pair of oppositely inclined cooling plates can define a cooling channel that widens outwards in the radial direction.

The invention also comprises rotors according to the invention, in which one or more cooling elements extend back and forth between the disc elements. Such a cooling element comprises several disc element contact regions along the cooling element, by means of which the cooling element comes into contact with one disc element and with the other disc element in an alternating fashion. Therefore, the at least one cooling element can comprise at least three disc element contact regions, wherein at least two disc element contact regions are in contact with one of the disc elements and a disc element contact region that is arranged between said disc element contact regions along the cooling element is in contact with the other disc element. The textile fabric extends through the disc element contact region that is arranged between the other disc element contact regions along the cooling element. The textile fabric preferably then extends from the first disc element contact region, across a plurality of additional disc element contact regions, and as far as the last disc element contact region. The textile fabric is preferably then a bundle of fibres, for example a bundle of carbon fibres. The fibres extending through a plurality of disc element contact regions provide the rotor according to the invention with maximum stability. Potential weak points may form where fibres end in disc element contact regions. Such weak points are avoided where fibres extend through disc element contact regions. At the same time, such cooling elements can be implemented using quite thin bundles of fibres such that a high surface to volume ratio is automatically set, which in turn increases the cooling effect. Orthogonal projections of the three disc element contact regions into the respective internal surface of the disc element that is in contact with the particular disc element contact region then define three projection faces $A_{31}$, $A_{32}$, $A_{33}$. Each point $P_{31}$, $P_{33}$ that lies inside the projection faces $A_{31}$ and $A_{33}$ then defines, together with two points $P_{32a}$, $P_{32b}$ that lie inside the projection face $A_{32}$, the corners of a trapezium. If a point $P_{31}$, $P_{33}$ can be determined in each of the projection faces $A_{31}$, $A_{33}$ and two points $P_{32a}$, $P_{32b}$ can be determined in the projection face $A_{32}$ such that these four points define a trapezium, a rotor according to the invention, which is preferred in this sense, is provided.

In the trapeziums mentioned here, two of the four angles enclosed by the trapezium are preferably the same size. Angles of the same size are considered to be angles that differ by no more than 5°. The two smaller angles are preferably each less than 89°, in particular less than 80°, for example less than 70° but at the same time 20°, in particular more than 30°, for example more than 35°.

As already mentioned above, it is advantageous for two cooling elements or cooling element regions to be arranged close to one another in the rotor. This can, in turn, be described in more detail by the trapezium described here, wherein the arrangement close to one another finds expression in that the shorter of the two sides of the trapezium extending in parallel takes up no more than 10% of the overall length of all four edges of the trapezium, preferably no more than 8%, in particular no more than 6%, for example no more than 4% of the overall length of all four edges of the trapezium. The cooling elements or cooling element regions are then oriented (as a rough approximation) in the shape of a triangle, wherein two cooling elements or two cooling element regions of a cooling element define two sides of the triangle and a portion of one of the two disc elements defines the third side of the triangle. It is clear that this further increases the torsional rigidity of the rotor.

The greatest longitudinal extension of a cooling element between the disc elements is preferably no more than 70% of the radius of the disc element having the largest radius. The cooling elements or cooling element regions are preferably distributed in the rotor such that certain cooling elements or cooling element regions circulate inside an inner region of the rotor and other cooling elements or cooling element regions circulate inside an outer region of the rotor. The inner and outer region do not overlap. The cooling elements or cooling elements regions are therefore arranged such that an outermost point of an internal cooling element or cooling element region is closer to the axis of rotation of the rotor than an innermost point of an external cooling element. This distance in the radial direction causes additional swirls, i.e. turbulent flows in far regions, such that the heat produced during braking is dissipated particularly efficiently.

In specific rotors according to the invention, the disc element contact regions can be mounted on the internal surfaces of the two disc elements in a planar manner. However, it is preferable for the disc element contact regions to extend in recesses in the two disc elements. The textile fabric then extends into the disc element. This allows for particularly rigid anchoring. The risk of a brittle fracture between cooling elements and disc elements is minimised. The transition between the disc element and cooling element can then be designed for permanent extreme mechanical and thermal loading with minimal effort.

The invention is not limited to certain disc element materials. For example, the disc elements be made of steel or other metals/metal alloys with which a person skilled in the art is familiar for the purpose of producing brake discs. However, according to the invention, it is particularly preferable for at least one disc element to comprise a ceramic fibre composite, such as a silicon carbide fibre composite, in particular a silicon carbide/carbon fibre composite. In this case, the word "comprise" is intended to express that other materials present in the laminar composite, for example the point the brake pad is pressed on, may be applied. The disc element may comprise these. All the disc elements preferably comprise a ceramic fibre composite, for example a silicon carbide fibre composite, in particular a silicon carbide/carbon fibre composite.

An integral bond and/or interlocking connection between the textile fabric and disc elements can be formed by a ceramic matrix, for example by a matrix containing silicon carbide, which is embedded in the textile fabric and which extends as far as the two disc elements. The disc element contact regions are then the surfaces of the textile fabric where said disc element contact regions are in contact with the disc elements.

The number of disc elements is not limited. Since the invention relates to an internally ventilated rotor, the number of disc elements is, however, at least two. The ventilated region arranged between the disc elements arranged furthest out can, in turn, be interrupted by disc elements. For specific applications, such intermediate disc elements may be advantageous, for example the surface of the internally ventilated region can be further increased thereby and therefore overheating of the brake disc can be counteracted even more effectively. Therefore, the number of disc elements can be at least three, for example. Typically, two of the disc elements are then friction disc elements and at least one disc element is an intermediate disc element. An intermediate disc element can also function as a supporting disc element, by means of which other disc elements, such as the friction disc elements, can be connected to a rotary axle.

Figure 5:
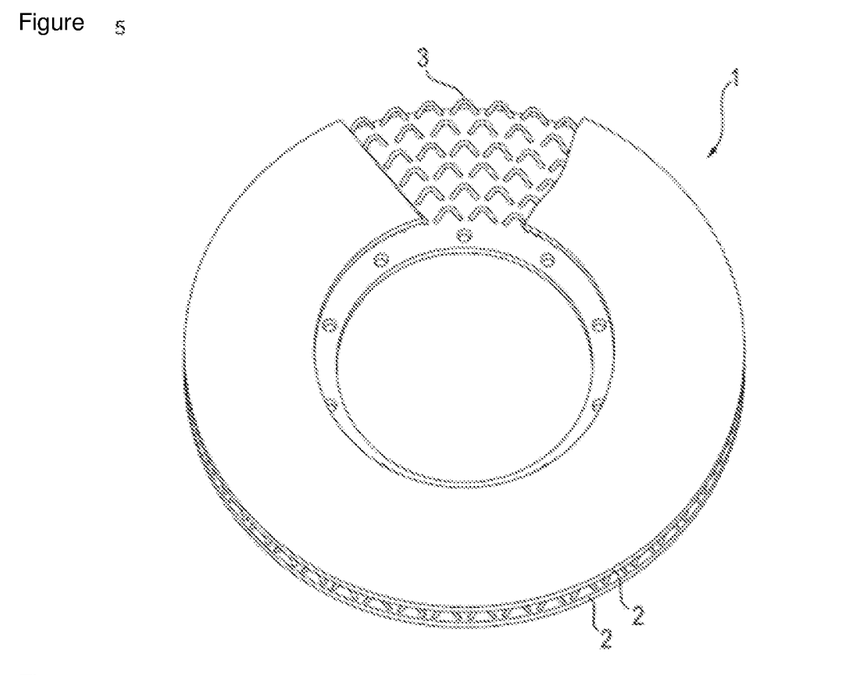
FIG. 5 shows another rotor according to the invention.
Figure 5A:
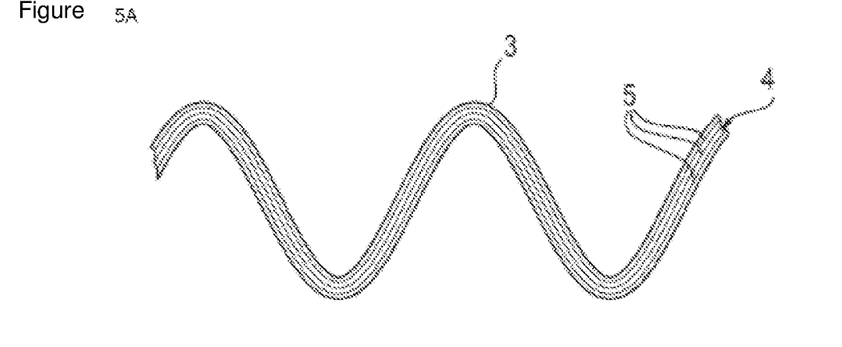
FIG. 5A shows a cut-out of a cooling element of the rotor from FIG. 5.

A rotor according to the invention can be connected to the axle by means of a brake disc mounting bell that is rigidly connected to the axle and to which the rotor is attached. The rotor can be attached to the brake disc mounting bell by means of conventional fastening means, such as screws. In certain embodiments, the fastening means only extend as far as one of the at least two disc elements. The inner diameter of this disc element is then usually smaller than the inner diameter of the other disc element or the other disc elements, as shown in FIG. 5, for example, in which only one disc element comprises holes for receiving fastening means such as screws. In this case, the inner diameter is understood to mean the smallest distance taken up by a disc element with respect to the axis of rotation of the rotor.

For several applications, such as in the automotive sector, the number of disc elements is two. Both disc elements are then typically friction disc elements. A friction disc element is understood to mean a disc element, on the surface of which a brake pad is intended to act. Certain (annular) friction disc elements are often referred to as friction rings.

Internally ventilated rotors according to the invention may, for example, be obtained by means of a method, wherein
a) cooling elements or cooling element precursors (for example prepregs cut to size to form laminae) are positioned relative to one another in a supporting material such that they project on either side of the supporting material,
b) solidifiable disc element compounds are applied to opposite surfaces of the supporting material such that the cooling elements or cooling element precursors protrude into the solidifiable disc element compounds, and
c) the disc element compounds are solidified.

For example, a polymer foam may be used as the supporting material. Targetedly oriented slits can be made therein, in which laminae (prepreg laminae) reinforced with carbon fibre laid scrim or carbon fibre woven fabric are inserted so as to protrude from the supporting material on either side. A polymer resin mixed with carbon fibre bundle portions can be used as the disc element compound. The disc element compound applied is hardened (solidified) by heating. The supporting material can then be removed, for example by pyrolysis. The green body obtained in this way is carbonised and then infiltrated with silicon in a manner that is known to a person skilled in the art, wherein the silicon reacts with the carbonised resin to form the matrix containing silicon carbide. infiltration is carried out such that the silicon spreads out from one disc element, across the cooling element laminae, and into the other disc element.

BRIEF DESCRIPTION OF THE FIGURES

The invention will be illustrated by the following drawings and embodiments, without being limited thereto, in which.

DETAILED DESCRIPTION

The internally ventilated rotors 1 shown in the drawings comprise two disc elements 2 that are connected to one another by means of at least one cooling element 3 (FIGS. 1 and 5). The at least one cooling element 3 comprises a textile fabric 4, as shown in FIG. 3 for the rotor from FIG. 1 and in FIG. 5A for the rotor from FIG. 5. According to the invention, the textile fabric 4 extends from a disc element contact region 31 of the cooling element 3, by means of which the cooling element 3 is in contact with a disc element 2, as far as into another disc element contact region 32, by means of which the cooling element 3 is in contact with another disc element 2. This can be seen from FIGS. 2 and 3 for the rotor from FIG. 1 and from FIGS. 5A and 6A for the rotor from FIG. 5. The textile fabric 4 is only shown in FIGS. 3 and 5A. For reasons of clarity, the depiction of the textile fabric 4 has been dispensed with in the other drawings.

In all the embodiments of the rotor according to the invention shown in the drawings, all the textile fabrics 4 comprise fibres 5 extending in parallel. These are carbon fibres in each case. However, other fibres would also be conceivable, for example silicon carbide fibres and boron nitride fibres. This can be seen from FIGS. 3 and 5A. In the examples shown in these drawings, not only at least one of the fibres 5 extending in parallel extends from one disc element contact region 31 of the cooling element 3 as far as into the other disc element contact region 32 of the cooling element in each case, but rather all the fibres 5 extending in parallel. Therefore, in FIG. 3, the textile fabric 4 is a laid scrim 41 and a plurality of fibres 5 extending in parallel therein extend from one disc element contact region 31 of the cooling element 3 as far as into the other disc element contact region 32 of the cooling element 3.

Figure 4A:
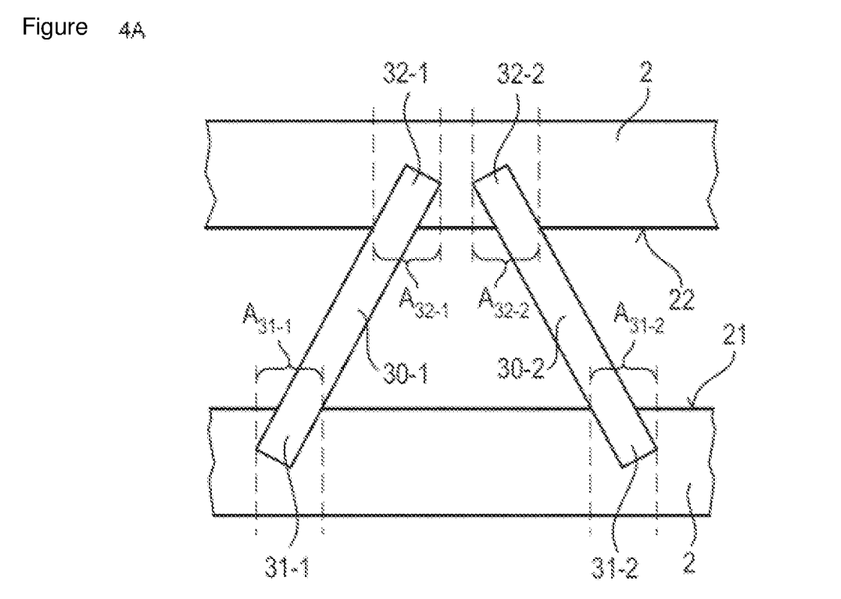
FIGS. 4A and 4B show the same section through the rotor from FIGS. 1 and 2, each comprising different information.
Figure 6A:
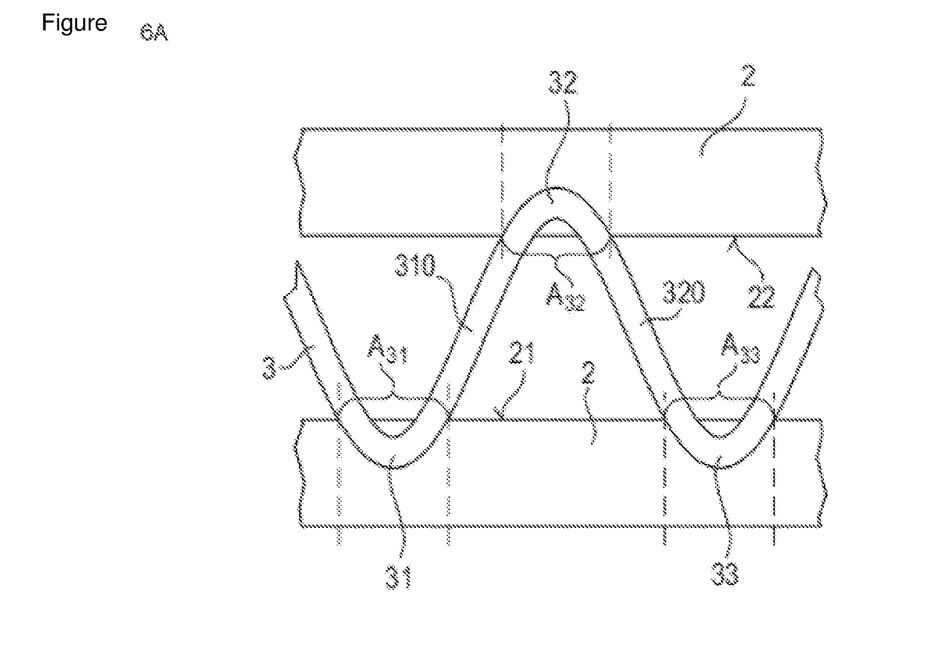
FIG. 6A shows a section through the rotor from FIG. 5.
Figure 6B:
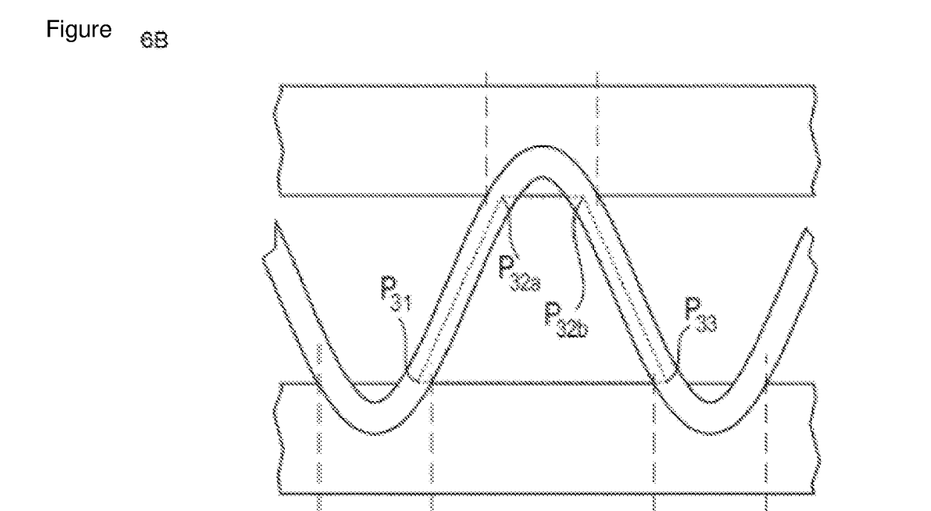
FIG. 6B shows a section through the rotor from FIG. 5.

In the rotor of FIGS. 1 to 4B, the cooling elements 3 are cooling plates (30-1 and 30-2 in the section of FIG. 4A). In the rotor of FIGS. 5 to 6B, cord-shaped cooling elements 3 extend up and down in a circular fashion and thereby each come into contact with the two disc elements 2 in an alternating fashion. This can be implemented by means of a towpreg, for example, which is passed through two material plies, for example nonwoven fabric plies that are spaced apart, from the top down and then again from the bottom up in an alternating fashion in order to connect the material plies to one another at the desired distance. The material plies stitched in this way by means of a towpreg may be transferred, for example, into a rotor according to the invention in that solidifiable disc element compound (for example a polymer resin mixed with carbon fibre bundle portions) is applied to the two external surfaces of the material plies, this compound solidifies, for example hardens, and the green body obtained is then carbonised and subsequently infiltrated with silicon. A towpreg is understood to mean a cord-shaped impregnated bundle of fibres. It can be impregnated with a resin, for example. The bundle of fibres can, for example, be a bundle of carbon fibres. Instead of the towpreg, however, a non-impregnated cord-shaped bundle of fibres could also be used, for example a cord-shaped bundle of carbon fibres.

Figure 7A:
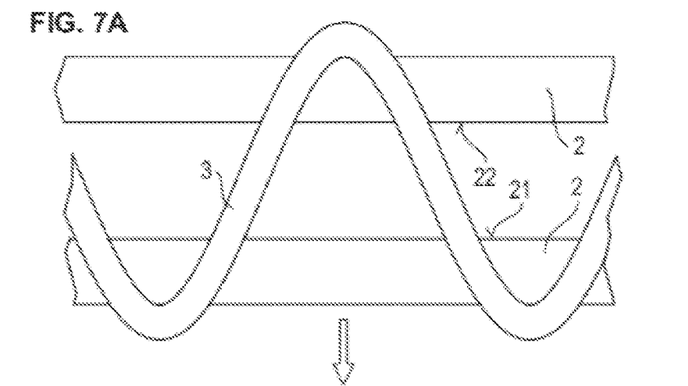
FIG. 7A illustrates the production of another rotor according to the invention by means of sections.
Figure 7B:
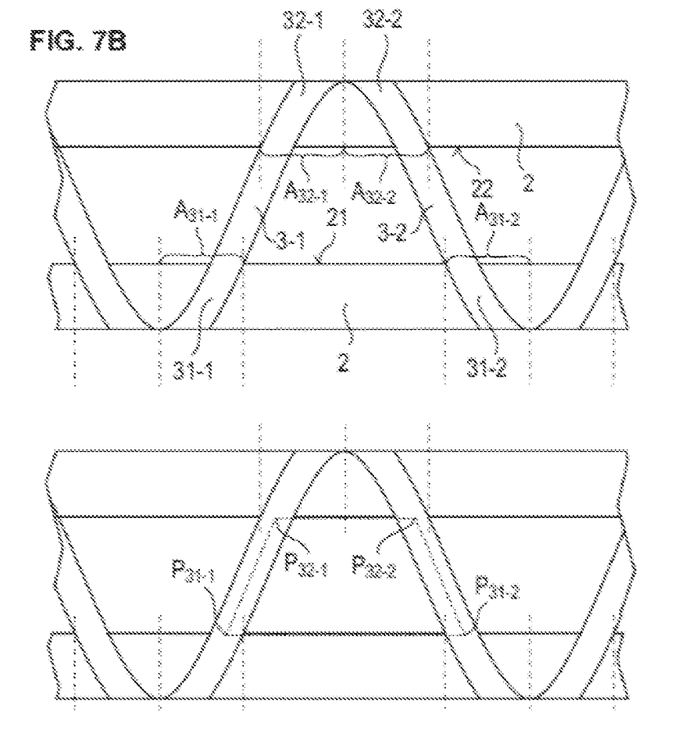
FIG. 7B illustrates the production of another rotor according to the invention by means of sections.

Alternatively, the application of the solidifiable disc element compound can be dispensed with and only the towpreg and optionally resin components contained in the material plies connected therewith may be hardened, then carbonised and subsequently infiltrated with silicon. In order to avoid any unevenness on the surfaces oriented towards the outside caused by the towpreg or cooling element precursor, protruding towpreg portions can be milled off. FIGS. 7A and 7B show that cooling elements 3 can firstly be brought into contact with the disc elements or disc element precursors such that they protrude beyond the external surfaces of the disc elements or the disc element precursors present prior to a silicon infiltration process (FIG. 7A). The towpreg can be passed through two material plies, for example nonwoven fabric layers that are spaced apart, from the top down and then again from the bottom up in an alternating fashion, as described above. The arrow leading from FIG. 7A to the top illustration in FIG. 7B shows that the portions of the cooling elements 3 protruding beyond the external surfaces of the disc elements can be milled off. Milling-off can, for example, be done before infiltration with silicon, since the SiC-free cooling element precursor that is present at this point can be processed more easily than after infiltration with silicon (which is associated with the formation of very hard SiC).

In all the examples shown, the relation of the cooling surface area A of the cooling element 3 facing the interior of the brake disc to the volume V of the portion of the cooling element facing the interior of the brake disc is far greater than 0.4 $mm^{-1}$.

It is clearly visible that, in all the embodiments shown, the cooling elements 3, 3-1, 3-2 extend at an angle of less than 89° with respect to these two disc elements at the point that is arranged between two adjacent disc elements 2 and is equidistant from these two disc elements 2. Sections 4A, 6A and 7B each show this the clearest, even without the point that is equidistant from each of the two adjacent disc elements being shown in one of the drawings. From these sections it is also immediately clear that they each comprise at least two cooling elements (3-1 and 3-2 in FIG. 7B) that are oppositely inclined, such as cooling plates (30-1, 30-2 in FIG. 4A) that are oppositely inclined, or two cooling element regions of a cooling element (310, 320 in FIG. 6A) that are oppositely inclined.

Figure 4B:
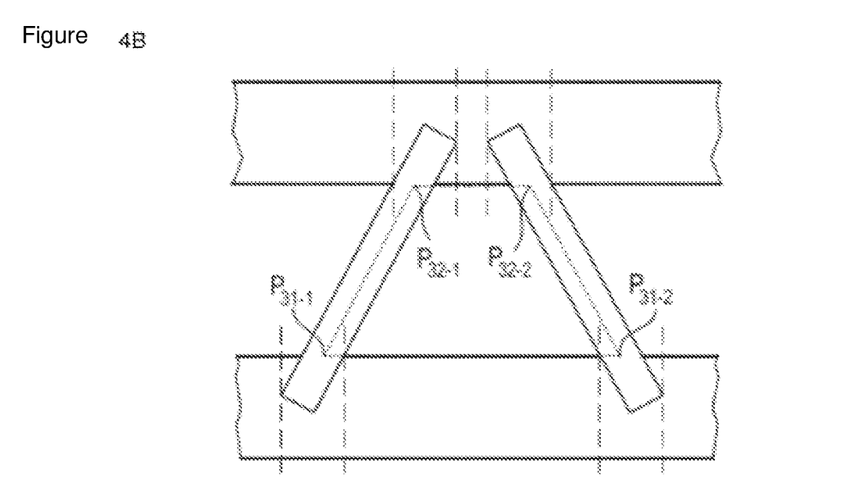

FIGS. 4B, 6B and 7B show dotted trapeziums, by means of which rotors that are particular preferred according to the invention can be described in more detail. The four corners of the trapezium each lie in projection faces that are defined by orthogonal projections, i.e. projections that are orthogonal to the internal surfaces of the disc elements. The outlines of the projection faces are shown by dashed lines extending in the projection direction in each of the sections in FIGS. 4A, 4B, 6A, 6B and 7B.

The rotor according to the invention of FIGS. 1 to 4B comprises pairs of adjacent cooling plates (30-1, 30-2 in FIG. 4A). Orthogonal projections (see dashed lines in FIGS. 4A and 4B) of the four disc element contact regions 31-1, 32-1, 31-2, 32-2 into the respective internal surface 21, 22 of the disc element that is in contact with the particular disc element contact region define four projection faces $A_{31\text{-}1}$, $A_{32\text{-}1}$, $A_{31\text{-}2}$, $A_{32\text{-}2}$. Four points $P_{31\text{-}1}$, $P_{32\text{-}1}$, $P_{31\text{-}2}$, $P_{32\text{-}2}$ lying inside the projection faces in turn define the corners of said trapezium.

The rotor according to the invention, which is shown in the section in FIG. 7B, comprises an arrangement of cooling elements that have been separated or severed, similar to the cooling plates in FIGS. 1 to 4B. By means of the milling-off process, the original continuous cooling element precursor has been completely severed in the protruding regions such that it comprises pairs of adjacent cooling elements (3-1, 3-2 at the top of FIG. 7B). Orthogonal projections (see dashed lines at the top and bottom of FIG. 7B) of the four disc element contact regions 31-1, 32-1, 31-2, 32-2 into the respective internal surfaces 21, 22 of the disc element that is in contact with the particular disc element contact region define four projection faces $A_{31\text{-}1}$, $A_{32\text{-}1}$, $A_{31\text{-}2}$, $A_{32\text{-}2}$, just like in the sections in FIGS. 4A and 4B. Here, too, four points $P_{31\text{-}1}$, $P_{32\text{-}1}$, $P_{31\text{-}2}$, $P_{32\text{-}2}$ lying inside the projection faces define the corners of said trapezium.

In contrast to the rotors in FIGS. 1 to 5A and 7B, the cord-shaped cooling element 3 in FIGS. 5 to 6B comprises not only two, but a plurality of, disc element contact regions 31, 32, 33 . . . , only three of which are shown in FIGS. 6A and 6B. The trapezium can still be defined in the same way as the rotors in FIGS. 1 to 5A and 7B. However, two of the four corners of the trapezium $P_{32a}$, $P_{32b}$ then lie in a single projection face $A_{32}$, as shown in FIG. 6B. In the rotor in FIGS. 5 to 6B, the cooling element 3 comprises a plurality of disc element contact regions 31, 32, 33. At least two disc element contact regions 31, 33 are in contact with one of the disc elements. A disc element contact region 32 arranged between these disc element contact regions 31, 33 along the cooling element is in contact with the other disc element. The textile fabric 4 extends through the disc element contact region 32 that lies between the other disc element contact regions 31, 33 along the cooling element. In such embodiments of the invention, the textile fabric generally extends from one end of the cord-shaped cooling element as far as the other end of the cord-shaped cooling element and through all the disc element contact regions arranged between the ends. Orthogonal projections of the three disc element contact regions 31, 32, 33 into the respective internal surface 21, 22 of the disc element that is in contact with the respective disc element contact region therefore define three projection faces $A_{31}$, $A_{32}$ $A_{33}$ in this case. Each point $P_{31}$, $P_{33}$ lying inside the projection faces $A_{31}$, $A_{33}$ defines, together with two points $P_{32a}$, $P_{32b}$ lying inside the projection face $A_{32}$, the corners of the trapezium.

In FIGS. 4B, 6B and 7B, in each case, two of the four angles formed by the trapezium are the same size.

In order to allow for especially rigid anchoring in the disc elements, the textile fabric extends as far as the disc element in all the embodiments of the invention shown in the drawings. Independently of the embodiments specifically shown here, this is always particularly preferable according to the invention. The disc element contact regions 31, 32, 33, 31-1, 31-2, 32-1, 32-2 therefore extend in recesses in the two disc elements 2.

In all the drawings, rotors are shown in which both disc elements are silicon carbide/carbon fibre composite friction discs and in which an integral bond and interlocking connection between disc element contact regions 31, 32, 33, 31-1, 32-1, 31-2, 32-2 and disc elements 2 is formed by a matrix containing silicon carbide, in which the textile fabric 4 or the carbon fibres included extending in parallel in said fabric are embedded. The matrix extends as far as into the two disc elements.

Similarly to the rotor according to the invention of FIGS. 1 to 4B, the rotor according to the invention of FIGS. 8 to 10 also comprises cooling elements 3 as pairs of adjacent cooling plates (30-1, 30-2). The cooling plates are not only oppositely inclined, but are also arranged such that the two edges closer to the axis of rotation of the rotor extend more closely to one another than the two edges of the cooling plates further away from the axis of rotation of the rotor; or such that the two edges closer to the axis of rotation of the rotor are further away from one another than the two edges of the cooling plates that are further away from the axis of rotation of the rotor. Cooling channels may be defined by means of such an arrangement of cooling plates 30-1, 30-2, which channels taper or widen in the radial direction.

The invention claimed is:

1. An internally ventilated rotor, comprising:
    a first disc element; and
    a second disc element, wherein the first disc element and the second disc element are connected to each another by a cooling element comprising a textile fabric comprising both a woven fabric and a nonwoven fabric, the textile fabric extending from a first disc element contact region of the cooling element, where the cooling element is in contact with the first disc element, into second disc element contact region where the cooling element is in contact with the second disc element.

2. The internally ventilated rotor according to claim 1, wherein the textile fabric comprises fibers extending in parallel and at least one of the fibers extending in parallel extends from the first disc element contact region of the cooling element into the second disc element contact region of the cooling element.

3. The internally ventilated rotor according to claim 2, wherein the textile fabric comprises a laid scrim and a plurality of fibers extending in parallel therein extend from the first disc element contact region of the cooling element into the second disc element contact region of the cooling element.

4. The internally ventilated rotor according to claim 1, further comprising:

a pair of adjacent cooling elements, wherein orthogonal projections of four disc element contact regions of the pair of adjacent cooling elements into respective internal surfaces of a disc element in contact with each respective disc element contact region define four projection faces ($A_{31\text{-}1}$, $A_{32\text{-}1}$, $A_{31\text{-}2}$, $A_{32\text{-}2}$) and four points ($P_{31\text{-}1}$, $P_{32\text{-}1}$, $P_{31\text{-}2}$, $P_{32\text{-}2}$) that lie inside projection faces defining corners of a trapezium.

5. The internally ventilated rotor according to claim 4, wherein a shorter side of the two sides of the trapezium extending in parallel takes up no more than 10% of an overall length of all four edges of the trapezium.

6. The internally ventilated rotor according to claim 1, wherein the cooling element further comprises at least three disc element contact regions, of which at least two disc element contact regions are in contact with the first disc element and a disc element contact region between the at least two disc element contact regions is in contact with the second disc element and the textile fabric extends through the disc element contact region between the at least two disc element contact regions.

7. The internally ventilated rotor according to claim 6, wherein orthogonal projections of the three disc element contact regions into the respective internal surface of the disc element that is in contact with the particular disc element contact region define three projection faces ($A_{31}$, $A_{32}$, $A_{33}$) and each point ($P_{31}$, $P_{33}$) that lies inside the projection faces ($A_{31}$, $A_{33}$) defines, together with two points ($P_{32a}$, $P_{32b}$) that lie inside the projection face ($A_{32}$), corners of a trapezium.

8. The internally ventilated rotor according to claim 1, wherein the textile fabric comprises silicon carbide fibers.

9. The internally ventilated rotor according to claim 1, wherein each cooling element is a cooling plate.

10. The internally ventilated rotor according to claim 1, wherein a ratio of a cooling surface area A of the cooling element, to a volume V of the cooling element is at least 0.4 $mm^{-1}$.

11. The internally ventilated rotor according to claim 1, further comprising:
at least two cooling elements that are oppositely inclined.

12. The internally ventilated rotor according to claim 1, wherein the disc element contact regions extend into recesses in the first disc element and the second disc element.

13. The internally ventilated rotor according to claim 1, wherein each disc element comprises a ceramic fiber composite.

14. The internally ventilated rotor according to claim 1, wherein an integral bond between the disc element contact regions and the disc elements is formed by a matrix containing silicon carbide.

15. The internally ventilated rotor according to claim 1, wherein both disc elements are friction disc elements.

* * * * *